United States Patent

Röber et al.

Patent Number: 5,313,987
Date of Patent: May 24, 1994

[54] MULTILAYER PLASTIC PIPE COMPRISING AN OUTER POLYAMIDE LAYER AND A LAYER OF A MOLDING FORMED FROM A MIXTURE OF THERMOPLASTIC POLYESTER AND A COMPOUND HAVING AT LEAST TWO ISOCYANATE GROUPS

[75] Inventors: Stefan Röber, Marl; Joachim Mügge, Haltern; Roland Feinauer, Marl; Hans Jadamus, Marl; Hans-Dieter Herrmann, Marl; Hans Ries, Marl, all of Fed. Rep. of Germany

[73] Assignee: Huels Aktiengesellschaft, Marl, Fed. Rep. of Germany

[21] Appl. No.: 47,030

[22] Filed: Apr. 16, 1993

[30] Foreign Application Priority Data

May 12, 1992 [DE] Fed. Rep. of Germany ....... 4215608

[51] Int. Cl.$^5$ ................................. F16L 09/14
[52] U.S. Cl. .................. 138/137; 138/DIG. 7
[58] Field of Search ............. 138/118, 137, 140, 141, 138/177, DIG. 1

[56] References Cited

U.S. PATENT DOCUMENTS

| | | |
|---|---|---|
| 3,378,602 | 4/1963 | Robertson . |
| 4,410,661 | 10/1983 | Epstein et al. ............ 138/137 |
| 4,443,519 | 4/1984 | Donermeyer et al. . |
| 4,528,219 | 7/1985 | Yamada et al. . |
| 4,656,242 | 4/1987 | Swan et al. . |
| 4,725,488 | 2/1988 | Swan et al. . |
| 4,762,589 | 8/1988 | Akiyama et al. ............ 138/137 |
| 4,802,938 | 2/1989 | Kitami et al. ............ 138/141 |
| 4,855,181 | 8/1989 | Shimo et al. . |
| 4,968,545 | 11/1990 | Fellman et al. ............ 138/137 |
| 5,038,833 | 8/1991 | Brunnhofer ............ 138/137 |
| 5,076,329 | 12/1991 | Brunnhofer ............ 138/140 |
| 5,108,844 | 4/1992 | Blemberg et al. . |

FOREIGN PATENT DOCUMENTS 0384404 8/1990 European Pat. Off. .
3827092 9/1989 Fed. Rep. of Germany .

Primary Examiner—James E. Bryant, III
Attorney, Agent, or Firm—Oblon, Spivak, McClelland, Maier & Neustadt

[57] ABSTRACT

A plastic pipe having improved resistance to methanol-containing fuels and improved mechanical properties is provided. This is achieved by a multilayer plastic pipe consisting of at least one outer layer based on polyamide and at least one layer of a linear, crystalline polyester modified with isocyanates. With the aid of the invention it is possible to obtain plastic pipes having improved barrier properties against methanol-containing fuels and dimensional stability and mechanical load-bearing capacity.

11 Claims, 1 Drawing Sheet

COMPOUND I
POLYAMIDE

COMPOUND II
MIXTURE OF THERMOPLASTIC POLYESTER AND A COMPOUND CONTAINING AT LEAST TWO ISOCYANATE GROUPS

COMPOUND I
POLYAMIDE

COMPOUND II
MIXTURE OF THERMOPLASTIC
POLYESTER AND A COMPOUND
CONTAINING AT LEAST TWO
ISOCYANATE GROUPS

COMPOUND I
POLYAMIDE

COMPOUND II
MIXTURE OF THERMOPLASTIC
POLYESTER AND A COMPOUND
CONTAINING AT LEAST TWO
ISOCYANATE GROUPS

MULTILAYER PLASTIC PIPE COMPRISING AN OUTER POLYAMIDE LAYER AND A LAYER OF A MOLDING FORMED FROM A MIXTURE OF THERMOPLASTIC POLYESTER AND A COMPOUND HAVING AT LEAST TWO ISOCYANATE GROUPS

BACKGROUND OF THE INVENTION

1. Field of the Invention

The present invention relates to a multilayer plastic pipe and a process for using such a multilayer plastic pipe for transporting chemicals.

2. Description of the Background

Plastic pipes made of polyamide are known and are used for a variety of applications. In order to fulfil their function, the pipes must be inert to the medium flowing through them, and resistant to high and low temperatures and to mechanical loads.

Single-layer pipes are not always capable of meeting the necessary requirements. For example, for the transport of aliphatic or aromatic solvents, fuels or the like, single-layer pipes have significant disadvantages such as inadequate barrier effect against the medium, undesired dimensional changes or insufficient mechanical load-bearing capacity.

Attempts have been made to overcome these disadvantages using multilayer pipes (German Offenlegungsschriften 35 10 395; 37 15 251; 38 21 723; 40 01 125; 40 01 126). However, the practical application of these attempts shows that although individual disadvantages can be avoided, the overall spectrum of properties is still not satisfactory.

German Patent 38 27 092 discloses a multilayer plastic pipe having, from inside outwards, layers of polyamide, polyvinyl alcohol, polyamide and polyester. The polyester is used only in a thin outer layer in order to achieve a higher short-term heat resistance.

It is known that most polymers, including polyamides and polyesters, are incompatible with one another resulting in a lack of adhesion between laminate layers of multilayer composites produced from such incompatible polymers. Accordingly, it is desirable to achieve an adhesion-based bond between the individual polymer layers in a laminate.

In addition, the permeation of methanol-containing fuels through single-layer pipes can only be reduced slightly by the above-mentioned attempts using multilayer pipes. The reduction in the permeation by using novel intermediate layers is, therefore, of crucial importance because permissible emission values are being further reduced by statutory regulations.

SUMMARY OF THE INVENTION

Accordingly, one object of the present invention is to provide a polyamide pipe having good barrier properties against the transported medium, such as methanol-containing fuels, and good dimensional stability and mechanical load-bearing capacity.

Briefly, this object and other objects of the present invention as hereinafter will become more readily apparent can be attained by a multilayer plastics pipe comprising I) at least one outer layer comprising polyamide and
II) at least one layer of a molding prepared from a mixture of a) 99 to 60% by weight of a linear crystalline polyester and
b) 1 to 40% by weight of a compound having at least two isocyanate groups, wherein the isocyanate groups of component IIb are present in a concentration between 0.03 and 3% by weight based on component II, and in which the layers are adhesively bonded to one another.

DETAILED DESCRIPTION OF THE PREFERRED EMBODIMENTS

Figure 1:
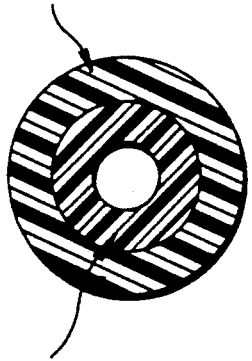
FIG. 1 illustrates the multilayer plastic pipe comprising components I and II.
Figure 2:
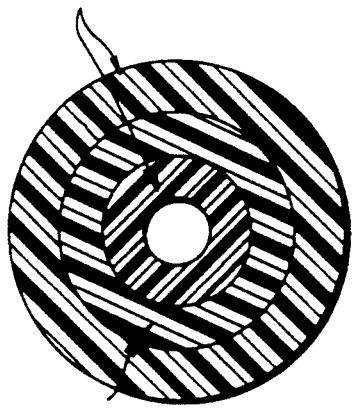
FIG. 2 illustrates the multilayer plastic pipe, wherein the pipe contains 3 or more layers of components I and II.

In the present invention, the layer according to component II is prepared from 99 to 60, preferably 98 to 70, and more preferably 97.5 to 90% by weight of polyester component IIa and 1 to 40, preferably 2 to 30, and more preferably 2.5 to 10% by weight of isocyanate component IIb. The isocyanate groups in the isocyanate component are present in a concentration between 0.03 and 3% by weight, preferably between 0.3 and 1.8% by weight of component II.

Suitable polyamides are primarily aliphatic homo- and copolycondensates. The 4,6-; 6,6-; 6,12-; 8,10-; 10,10-polyamides or the like may be used. Preferably, 6-; 10,12-; 11-; and 12,12-polyamides are used. The above identification of polyamides corresponds to international standards wherein the first numeral provides the number of carbon atoms in the starting diamine and the last numeral provides the number of carbon atoms in the dicarboxylic acid. If only one number is quoted, the starting substance was an $\alpha$-$\omega$-aminocarboxylic acid or the lactam derived therefrom. H. Domininghaus, Die Kunststoffe und ihre Eigenschaften (Plastic And Their Properties), page 272, VDI-Verlag (1976).

Copolyamides may be used and may be prepared from adipic acid, sebacic acid, suberic acid, isophthalic acid, terephthalic acid as co-acid, or bis(4'aminocyclohexyl)-methane, trimethylhexamethylenediamine, hexamethylenediamine or similar codiamine.

The preparation of these polyamides is known. D.B. Jacobs, J. Zimmermann, Polymerization Processes, p.424–67; Interscience Publishers, New York (1977); German Auslegeschrift 21 52 194.

Suitable polyamides include mixed aliphatic-/aromatic polycondensates and are described, for example, in U.S. Pat. Nos. 2,071,250; 2,071,251; 2,130,523; 2,130,948; 2,241.322; 2,312,966; 2,512,606; 3,393,210; and in Kirk-othmer, Encyclopedia of Chemical Technology, 3rd edition, volume 18, pages 328 and 435—Wiley & Sons (1982). Polycondensates suitable as polyamides include polyether ester amides) and poly(ether amides). Such products are described in German Offenlegungsschriften 27 12 987, 25 23 991, and 30 06 961.

The polyamides should have a number average molecular weight greater than 5,000, preferably greater than 10,000, and a relative viscosity ($\eta_{rel}$) in the range 1.5 to 2.8. In a preferred embodiment, the polyamides used for the polyamide component I have at least 50% of the end groups being amino groups. The polyamides may be used alone or in blends.

The linear, crystalline polyesters of component IIa have the following basic structure

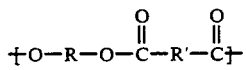

where R represents a divalent branched or unbranched aliphatic and/or cycloaliphatic radical having 2 to 12, preferably 2 to 8 carbon atoms in the carbon chain and R' represents a divalent aromatic radical having 6 to 20, preferably 8 to 12 carbon atoms in the carbon skeleton.

Examples of diols which may be used to prepare the polyether component include ethylene glycol, trimethylene glycol, tetramethylene glycol, hexamethylene glycol, neopentyl glycol, cyclohexane dimethanol and the like. Up to 25 mol % of the diol can be replaced with a second diol mentioned above or having the following general formula

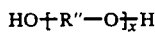

in which R" represents a divalent radical with 2 to 4 C atoms and x can have a value of 2 to 50. The diols used are preferably ethylene glycol and tetramethylene glycol.

Suitable aromatic dicarboxylic acids for preparing the polyether component include terephthalic acid, isophthalic acid, 1,4-, 1,5-, 2,6- and 2,7-naphthalenedicarboxylic acid, diphenic acid and diphenyl ether 4,4'-dicarboxylic acid. Up to 20 mol % of these dicarboxylic acids can be replaced by aliphatic dicarboxylic acids such as succinic acid, maleic acid, fumaric acid, sebacic acid, dodecanedioic acid.

The preparation of linear, crystalline polyesters of component IIa is known. German Offenlegungsschriften 24 07 155, 24 07 156; Ullmanns Encyclopadie der technischen Chemie (Ullmann's Encyclopedia of Industrial Chemistry), 4th edition, volume 19, page 65 ff.—Verlag Chemie GmbH, Weinheim, 1980.

The polyesters used according to the invention have a viscosity number (i value) in the range from 80 to 240 cm³/g.

The polyamide of component I and/or the linear, crystalline polyester of component IIa can contain up to 40% by weight of other thermoplastic polymers, so long as these other thermoplastic polymers do not impair the bonding capacity. Particular mention may be made of polycarbonate polymers (H. Schnell, Chemistry and Physics of Polycarbonates, Interscience Publishers, New York (1981)), acrylonitrile/styrene/butadiene copolymers (Houben-Weyl, Methoden der organischen Chemie [Methods in Organic Chemistry], volume 14/1, Georg Thieme Verlag Stuttgart, p. 393–406; Ullmanns Encyclopddie der technischen Chemie, 4th edition, volume 19, Verlag Chemie Weinheim (1981), p. 279-284), acrylonitrile/styrene/acrylate copolymers (Ullmanns Encyclopadie der technischen Chemie, 4th edition, volume 19, Verlag Chemie Weinheim (1981), p-. 277-295), acrylonitrile/styrene copolymers (Ullmanns Encyclopadie der technischen Chemie, 4th edition, volume 19, Verlag Chemie Weinheim (1981), p. 273 ff.), and polyphenylene ether polymers (German Offenlegungsschriften 32 24 691 and 32 24 692, U.S. Pat. Nos. 3,306,874; 3,306,875; and 4,028,341).

If desired, the polyamides and/or polyesters can be impact modified. Suitable impact modifying polymers include ethylene/propylene copolymers or ethylene/propylene/diene copolymers (EP-A-295,076), polypentenylene, polyoctenylene or random or block copolymers of alkenyl-aromatic compounds with aliphatic olefins or dienes (EP-A-261 748). In addition suitable impact-modifying rubbers include core/shell rubbers having a tough and resilient core of (meth)acrylate, butadiene or styrene/butadiene rubber with glass transition temperatures less than −10° C., it being possible for the core to be crosslinked. The shell can be made up of styrene and/or methyl methacrylate and/or other unsaturated monomers (German Offenlegungsschriften 21 44 528, 37 28 685). The proportion of impact-modifying component should be chosen such that the desired properties are not impaired.

As component IIb, compounds are used which have at least two isocyanate groups. Suitable compounds include di- and higher functional isocyanates, preferably aromatic and cyclo-aliphatic isocyanates such as 1,4-phenylene diisocyanate, 2,4-tolylene diisocyanate, 2,6-tolylene diisocyanate, 1,5-naphthylene diisocyanate, 1,6-hexamethylene diisocyanate, diphenylmethane 2,4-diisocyanate, diphenylmethane 4,4'-diisocyanate, diphenylmethane 2,2'-diisocyanate, isophorone diisocyanate, 1,4-tetramethylene diisocyanate, 1,12-dodecane diisocyanate and triphenylmethane 4,4',4"-triisocyanate. Other examples are cyclohexane 1,3-diisocyanate, cyclohexane 1,4-diisocyanate, cyclobutane 1,3-diisocyanate, 2,4-hexahydrotolylene diisocyanate, 2,6-hexahydrotolylene diisocyanate, hexahydro-1,3-phenylene diisocyanate, hexahydro-1,4-phenylene diisocyanate, norbonene diisocyanate, p- or m-xylylene diisocyanate, perhydro-2,4-diphenylmethane diisocyanate and perhydro-4,4'-diphenylmethane diisocyanate.

Isocyanates having isocyanurate, urethane, acylated urea, biuret, carbodiimide or ester groups are also suitable. Furthermore, oligomeric fatty acid-containing isocyanates or perchlorinated arylisocyanates can be used.

The isocyanates can also be used as blocked isocyanates. Reaction products of the aforementioned isocyanates with diols, lactams or oximes may be mentioned as examples. 2,4-and 2,6-tolylene diisocyanates and isocyanates having isocyanurate, urethane, urea or bioret groups are preferred. Also preferred are isophorone diisocyanates and/or isocyanurates derived therefrom.

The layers of components I and II can contain conventional auxiliaries and additives such as, for example, flame retardants, stabilizers, processing auxiliaries, viscosity improvers, fillers, pigments, and those for improving conductivity. The quantity of such conventional auxiliaries and additives should be metered in such a manner that the desired properties are not seriously affected.

The molding for the layer according to component II is prepared according to conventional and known processes by melt mixing components IIa and IIb in a mixing unit which effects thorough compounding, such as a twin-screw kneader, at temperatures which depend on the melting points of components IIa and IIb, generally at temperatures between 200 and 300° C. In preparing the molding for the layer according to component II, conventional and known catalysts for the processing of isocyanates can be used. The molding for the layer according to component II should be dry before the multilayer pipes are produced and should be stored in the absence of atmospheric moisture.

The above-described preparation of the molding for the layer according to component II can also be carried out directly in a feed extruder of a coextrusion unit or injection molding unit used for producing the multilayer pipes, so that the molding for the layer according to component II can be processed directly following its preparation—without further intermediate storage to form a layer of the multilayer pipe.

The multilayer pipes can be produced in a known manner as described above.

The multilayer pipes according to the invention have a high degree a good resistance and good barrier effect against diffusion of chemical agents, solvents and fuels. Furthermore, the two layers are adhesively bonded together so that the various layers do not shear apart from one another with thermal expansion or bending of the pipe. In addition, it is also possible to produce, apart from a two-layer pipe, other pipes having, for example, three or more layers by incorporating additional layers according to components I and/or II.

The multilayer plastic pipes according to the invention are preferably used for the transport of chemical agents such as brake, cooling and hydraulic fluids, and fuel.

The results listed in the examples were determined with the aid of the following measuring processes.

The solution viscosity (relative viscosity $\eta_{rel}$) of the polyamides was determined using a 0.5% strength by weight of a m-cresol solution at 25° C. according to DIN 53 727/ISO 307.

For determining the amino end groups, 1 g of the polyamides was dissolved in 50 ml of m-cresol at 25° C. The solution was potentiometrically titrated with perchloric acid.

For determining the carboxyl end groups in the polyamide, 1 g of polycondensate was dissolved in 50 ml of benzyl alcohol at 165° C. under a nitrogen blanket. The dissolution time not being more than 20 min. The solution was titrated with a solution of KOH in ethylene glycol (0.05 mol KOH/l) in the presence of phenolphthalein until color change.

The solution viscosity (viscosity number J) of the polyesters was determined in a 0.5% strength by weight phenol/o-dichlorobenzene solution (weight ratio 1:1) at 25° C. according to DIN 53 728/ISO 1628/5—part 5.

For determining the isocyanate groups, 6 g of component II (polyester, isocyanate) was dissolved at 180° C. in a mixture of dichlorobenzene/dibutylamine (80:20% by volume). The solution was titrated at 20° C. with 10% strength hydrochloric acid in the presence of bromophenol as an indicator (DIN 53 185).

The test of mechanical separability at the boundary surface between components was carried out using a metal wedge (edge angle: 5 degrees; contact weight: 2.5 kg) in order to separate the material boundary layer to be tested. If the separation occured at the boundary between the components, the adhesion was poor. If, on the other hand, the separation occured wholly or partly within one of the two components, good adhesion existed.

The determination of the diffusion of fuel components is carried out on pipes with a fuel mixture (fuel M15: 42.5 parts by volume of isooctane, 42.5 parts by volume of toluene and 15 parts by volume of methanol) at 23° C. and 50% air humidity. The pipes having a length of 200 mm were filled with the fuel mixture and were connected to a full supply container during the measurement. The diffusion was determined as the loss of mass by diffusion over time (measured every 24 hours). The loss of mass recorded per unit area measured when the diffusion process reached equilibrium, that is, when the loss of mass determined every 24 hours no longer changed with time, was used as the measure of diffusion.

Having generally described this invention, a further understanding can be obtained by reference to certain specific examples which are provided herein for purposes of illustration only and are not intended to be limiting unless otherwise specified.

EXAMPLES

A) Component I - Polyamide

PA 1: Polyamide 12 ($\eta_{rel}$ 2.08; 30% of the end groups are amino groups; 16 mmol/kg amino end groups; 36 mmol/kg carboxyl end groups)

PA 2: Polyamide 12 ($\eta_{rel}$ 2.10; 30% of the end groups are amino groups; 15 mmol/kg amino end groups; 34 mmol/kg carboxyl end groups; modified with 15% by weight of commercial plasticizer)

PA 3: Polyamide 6.12 ($\eta_{rel}$ 1.9; 88% of the end groups are amino groups; 93 mmol/kg amino end groups; 29 mmol/kg carboxyl end groups)

PA 4: Polyamide 6 ($\eta_{rel}$ 2.01; 51.6% of the end groups are amino groups; 33 mmol/kg amino end groups; 31 mmol/kg carboxyl end groups)

PA 5: Polyamide 12 ($\eta_{rel}$ 1.9; 86% of the end groups are amino end groups; 60 mmol/kg amino end groups; 10 mmol/kg carboxyl end groups)

PA 6: Polyamide 12 ($\eta_{rel}$ 2.0; 86.2% of the end groups are amino groups; 50 mmol/kg amino end groups; 8 mmol/kg carboxyl end groups; modified with 15% by weight of commercial plasticizer)

B) Component II

Z 1: Homopolybutylene terephthalate (J value: 165 cm$^3$/g; VESTODUR® 3000—HUELS AG; NCO content=0)

Z 2: Homopolybutylene terephthalate (J value: 145 cm$^3$/g; VESTODUR® 2000—HUELS AG; NCO content=0)

Z 3: Homopolyethylene terephthalate (POLYCLEAR® TR 86—HOECHST AG; NCO content=0)

Z 4: Ethylene/vinyl alcohol copolymer (EVAL® EP-E1O5A-KURARA; NCO content=0)

Z 5: Homopolybutylene terephthalate (J value: 115 cm$^3$/g; VESTODUR® 1000—HUELS AG; NCO content Z 6: Mixture of
  a. 90% by weight of homopolybutylene terephthalate (J value 115 cm$^3$/g; VESTODUR® 1000—HUELS AG) and
  b. 10% by weight of isocyanurate of isophorone diisocyanate (trimeric isocyanate with 12% by weight of NCO end groups based on component IIb) NCO group concentration in component II: 0.6% by weight.

Z 7: Mixture of
  a. 95% by weight of homopolybutylene terephthalate (J value 115 cm$^3$/g; VESTODUR® 1000—HUELS AG) and
  b. 5% by weight of isocyanurate of isophorone diisocyanate (trimeric isocyanate with 12% by weight of NCO end groups based on component IIb) NCO group concentration in component II: 0.3% by weight.

Z 8: Mixture of
a. 95% by weight of homopolybutylene terephthalate (J value 145 cm³/g; VESTODUR® 2000—HUELS AG) and
b. 5% by weight of a mixture consisting of
41.4% by weight of caprolactam
33.7% by weight of isocyanurate of isophorone diisocyanate
24.9% by weight of isophorone diisocyanate with 14.8-15.8% by weight of NCO end groups based on component IIb.
NCO group concentration in component II: 0.35% by weight.

Z 9: Mixture of
a. 97.5% by weight of homopolybutylene terephthalate (J value 115 cm³/g; VESTODUR® 1000—HUELS AG) and
b. 2.5% by weight of a mixture consisting of 41.4% by weight of caprolactam 33.7% by weight of isocyanurate of isophorone diisocyanate 24.9% by weight of isophorone diisocyanate with 14.8-15.8% by weight of NCO end groups based on component IIb. NCO group concentration in component II.: 0.17% by weight.

C) Production of multilayer pipes

The pipes were produced on a laboratory pipe extrusion system with a 5-layer pipe die (two channels remaining closed for producing 3-layer pipes). The feed extruders all had a screw diameter of 25 mm. The cylinder temperatures were 220° C. (PA 2; PA 5; PA 6; Z 4) ; 230° C. (PA 1); 240° C. (PA 3); 250° C. (Z 1; Z 2; Z 3; Z 5; Z 6; Z 7; Z 8; Z 9); 260° C. (Z 4). The layer thicknesses from inside outwards was: 0.2 mm; 0.2 mm; 0.6 mm.

| Test | Inner layer | Intermediate layer(s) | Outer layer | Diffusion [g × d$^{-1}$ × m$^{-2}$] | Mechanically Separable at the boundary surface -after storage at 23° C./in fuel* | |
|---|---|---|---|---|---|---|
| A | PA 1 | Z 1 | PA 1 | 1.2 | yes | yes |
| B | PA 2 | Z 2 | PA 2 | 1.4 | yes | yes |
| C | PA 3 | Z 3 | PA 3 | ** | yes | yes |
| D | PA 2 | PA 2 | PA 2 | 100 | no | no |
| E | PA 1 | PA 1 | PA 1 | 30 | no | no |
| F | PA 4 | Z 4 | PA 2 | 11 | no | no |
| G | PA 5 | Z 5 | PA 5 | 1.3 | yes | yes |
| 1 | PA 1 | Z 6 | PA 1 | 1.3 | no | no |
| 2 | PA 2 | Z 6 | PA 2 | 1.5 | no | no |
| 3 | PA 5 | Z 6 | PA 5 | 1.3 | no | no |
| 4 | PA 6 | Z 7 | PA 6 | 1.3 | no | no |
| 5 | PA 5 | Z 7 | PA 5 | 1.3 | no | no |
| 6 | PA 1 | Z 8 | PA 1 | 1.4 | no | no |
| 7 | PA 6 | Z 8 | PA 5 | 1.5 | no | no |
| 8 | PA 6 | Z 9 | PA 5 | 1.2 | no | no |
| 9 | PA 3 | Z 9 | PA 4 | 1.2 | no | no |

*Storage at 23° C. for 5 days in regular-fuel M 15 (42.5 parts by volume of isooctane, 42.5 parts by volume of toluene and 15 parts by volume of methanol)
**not determined

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A multilayer plastic pipe comprising
I) at least one outer layer comprising polyamide and
II) at least one layer of a molding formed from a mixture of
   a) 99 to 60% by weight of a linear partially crystalline thermoplastic polyester and
   b) 1 to 40% by weight of a compound having at least two isocyanate groups,
wherein the isocyanate groups originating from component IIb being contained in component II in a concentration between 0.03 and 3% by weight, adhesively bonded together.

2. The multilayer plastic pipe according to claim 1, wherein at least 50% of the end groups in the polyamide of component I are amino groups.

3. The multilayer plastic pipe according to claim 1 or 2, wherein the molding of component II is formed from a mixture of
   a) 98 to 70% by weight of a linear partially crystalline thermoplastic polyester and
   b) 2 to 30% by weight of a compound having at least two isocyanate groups.

4. The multilayer plastic pipe according to claim 1 or 2, wherein the molding of component II is formed from mixture of
   a) 97.5 to 90% by weight of a linear partially crystalline polyester and
   b) 2.5 to 10% by weight of a compound having at least two isocyanate groups.

5. The multilayer plastic pipe according to claim 1, wherein the isocyanate groups in the molding of component II are present in a concentration between 0.3 and 1.8% by weight of the molding.

6. The multilayer plastic pipe according to claim 1 wherein the isocyanate group containing compound has at least one isocyanurate, urethane, acylated urea, biuret, carbodiimide or ester group.

7. The multilayer plastic pipe according to claim 1, wherein the isocyanate group containing compound is isophorone diisocyanate, an isocyanurate derived from isophorone diisocyanate, or mixture thereof.

8. The multilayer plastic pipe according to claim 1, wherein the isocyanate group containing compound contains an isocyanate blocked by a lactam.

9. The multilayer plastic pipe according to claim 1, wherein the plastic pipe contains three or more layers I and II.

10. A process of using the multilayer plastic pipe according to claim 1 comprising transporting chemical agents therein.

11. A process of using the multilayer plastic pipe according to claim 8 or 9, comprising conveying fuel or brake, cooling, or hydraulic fluids therein.

* * * * *